US012701067B2

(12) United States Patent
Mao et al.

(10) Patent No.: US 12,701,067 B2
(45) Date of Patent: Aug. 4, 2026

(54) CONTENT DELIVERY NETWORK CAPACITY ESTIMATION

(71) Applicant: Lemon Inc., Grand Cayman (KY)

(72) Inventors: Pengsen Mao, Sydney (AU); Song Geng, Sydney (AU); Jun Gao, Sydney (AU)

(73) Assignee: Lemon Inc., Grand Cayman (KY)

( * ) Notice: Subject to any disclaimer, the term of this patent is extended or adjusted under 35 U.S.C. 154(b) by 53 days.

(21) Appl. No.: 18/979,896

(22) Filed: Dec. 13, 2024

(65) Prior Publication Data

US 2026/0172334 A1     Jun. 18, 2026

(51) Int. Cl.
H04L 43/0876     (2022.01)

(52) U.S. Cl.
CPC ................................ H04L 43/0876 (2013.01)

(58) Field of Classification Search
CPC ................................................. H04L 43/0876
See application file for complete search history.

(56) References Cited

U.S. PATENT DOCUMENTS

| | | | |
|---|---|---|---|
| 10,855,567 B1 * | 12/2020 | Mukhopadhyaya | .... H04L 43/18 |
| 11,848,845 B2 * | 12/2023 | Lemmons | ........... H04L 43/0852 |

* cited by examiner

*Primary Examiner* — Suraj M Joshi
(74) *Attorney, Agent, or Firm* — Fish & Richardson P.C.

(57)     ABSTRACT

The present disclosure involves methods, apparatus, and systems for predicting performance of a content delivery network (CDN). An example method includes determining a topology of a content delivery network (CDN); determining a first proxy node to test; testing the first proxy node at a test data rate to determine a first tested capacity of the first proxy node by: distributing the test data rate across intermediate nodes connected to the first proxy node; determining the first tested capacity of the first proxy node based on whether a total available capacity of edge nodes exceeds a distributed test data rate at the intermediate node; determining a second proxy node to test; testing the second proxy node to determine a second tested capacity of the second proxy node; and determining a capacity of the graph model based on the first tested capacity and the second tested capacity.

20 Claims, 5 Drawing Sheets

CONTENT DELIVERY NETWORK CAPACITY ESTIMATION

TECHNICAL FIELD

The present disclosure generally relates to generating and maintaining a model to predict performance of a content delivery network (CDN).

BACKGROUND

A content delivery network or content distribution network (CDN) is a geographically distributed network of proxy servers and their data centers. CDNs can provide high availability and performance ("speed") by distributing the service spatially relative to end users. CDNs today serve a large portion of the Internet content, including web objects (text, graphics and scripts), downloadable objects (media files, software, documents), applications (e-commerce, portals), live streaming media, on-demand streaming media, and social media sites.

SUMMARY

The present disclosure relates to a method, system, and computer-readable storage media for generating and managing a model to estimate a capacity and condition of a content delivery network (CDN). The solution can include determining a topology of a content delivery network (CDN), wherein the topology of the CDN comprises a plurality of edge nodes, a plurality of proxy nodes, a plurality of intermediate nodes, a plurality of first edges connecting the proxy nodes to the intermediate nodes, and a plurality of second edges connecting the intermediate nodes to the edge nodes; generating a graph model of the CDN using the topology of the CDN; determining a first proxy node to test; testing the first proxy node at a test data rate to determine a first tested capacity of the first proxy node by: distributing the test data rate across intermediate nodes connected to the first proxy node; determining the first tested capacity of the first proxy node based on whether a total available capacity of edge nodes connected to an intermediate node connected to the first proxy node exceeds a distributed test data rate at the intermediate node; determining a second proxy node to test; testing the second proxy node to determine a second tested capacity of the second proxy node; and determining a capacity of the graph model based on the first tested capacity of the first proxy node and the second tested capacity of the second proxy node.

Implementations can optionally include one or more of the following features.

In some instances, implementations include receiving an available capacity for each edge node of the plurality of edge nodes; and determining the total available capacity of the edge nodes connected to the intermediate node connected to the first proxy node based on respective available capacities of the edge nodes connected to the intermediate node connected to the first proxy node.

In some instances, implementations include in response to determining that the total available capacity of the edge nodes connected to each intermediate node connected to the first proxy node exceeds the distributed test data rate at each intermediate node: reducing an available capacity of the edge nodes connected to each intermediate node connected to the first proxy node by the distributed test data rate.

In some instances, implementations include in response to determining that the total available capacity of the edge nodes connected to each intermediate node connected to the first proxy node does not exceed the distributed test data rate at each intermediate node: reducing the test data rate by half and using the reduced test data rate in future tests.

In some instances, testing is performed iteratively until the test data rate is below a predetermined threshold.

In some instances, determining the topology of the CDN, comprises determining the topology of the CDN based on data of the plurality of edge nodes, the plurality of proxy nodes, the plurality of intermediate nodes, the plurality of first edges, and the plurality of second edges, and wherein the data is received from an online service in response to an application programming interface (API) call.

In some instances, implementations include receiving traffic usage data for each proxy node of the plurality of proxy nodes; and wherein determining the first proxy node to test and determining the second proxy node to test are based on the traffic usage data for each proxy node of the plurality of proxy nodes.

In some instances, determining the first proxy node and determining the second proxy node to test comprise performing a weighted round robin algorithm, and wherein weights for the weighted round robin algorithm are selected based on the traffic usage data for each proxy node.

In some instances, implementations include determining traffic usage data for each intermediate node of the plurality of intermediate nodes; and wherein distributing the test data rate across the intermediate nodes connected to the first proxy node based on their respective traffic usage data comprises distributing the test data rate proportionally to the respective traffic usage data of the intermediate nodes connected to the first proxy node.

In some instances, determining the capacity of the graph model comprises: summing tested capacities of the plurality of proxy nodes.

According to a second aspect, one or more computer-readable storage media is provided. The one or more computer-readable storage media stores one or more instructions that, when executable by one or more computers, cause the one or more computers to perform the method according to the first aspect or one or more implementations of the first aspect.

According to a third aspect, a computer-implemented system is provided. The computer-implemented system includes one or more computers and one or more computer memory devices interoperably coupled with the one or more computers. The one or more computer memory devices have computer-readable storage media storing one or more instructions that, when executed by the one or more computers, perform the method according to the first aspect or one or more implementations of the first aspect.

While generally described as computer-implemented software embodied on tangible media that processes and transforms the respective data, some or all of the aspects can be computer-implemented methods or further included in respective systems or other devices for performing this described functionality. The details of these and other aspects and implementations of the present disclosure are set forth in the accompanying drawings and the description below. Other features, objects, and advantages of the disclosure will be apparent from the description and drawings, and from the claims.

BRIEF DESCRIPTION OF DRAWINGS

Like reference numbers and designations in the various drawings indicate like elements.

DETAILED DESCRIPTION

This specification relates to methods, apparatuses, and systems for generating and managing a model to estimate a capacity and condition of a content distribution network (CDN). CDNs are a modern way to handle streaming acceleration by setting up a hierarchical structure using different layers of relay nodes. CDN capacity can be an important metric which informs the upstream (requester) how much traffic it can handle, improves system stability, and can also help navigating redundancy in the system, hence allows cutting unnecessary resources and saving costs.

There are several challenges to precisely find the capacity or bandwidth in a CDN. For example, cache hit can occur. When traffic passes nodes of a CDN, there can be a chance it will hit the cache. This violates conservation of flow which fails algorithms such as Network Flow. These disclosed techniques can help address the issue by modeling the expected cache hit for each node in the CDN. For example, during filling if a particular node has a 0.4 cache hit rate, the node's upstream pull rate will only be 60% of the traffic in the lower node, because 40% of the requested data was present in cache.

The disclosed techniques can provide a more accurate estimation of the capacity of the CDN and can help ensure that the traffic within the CDN is properly distributed, which can prevent conflicts in online scheduling. Additionally, the disclosed techniques can help achieve stability and service level agreement (SLA) guarantees. For example, ensuring the service SLA is 99.99% requires an accurate estimate of network capacity as capacity is a critical indicator for upstream systems. The disclosed techniques can be used not only in upstream systems to estimate pull capacity but also downstream systems to estimate push capacity, for example, by reversing the direction of the traffic low.

The disclosed techniques can provide a scalable process for estimating capacity. In modern CDN, the levels of internet service providers (ISPs)/Regions/Province/etc. can vary and be complex. The disclosed techniques can take these factors into consideration, provide scalability to enable flexible use across broadly different sized CDNs. For example, in some implementations, the disclosed techniques can consider the edge factors and ISP separations. The disclosed techniques can approximate CDN capacity in a more precise and reliable way, which improves online stability, helps businesses to strategically analyze traffic scheduling, and remove redundant clusters to reduce cost. The disclosed techniques can be computationally efficient. With fast execution, the disclosed techniques can provide a valid and closely up-to-date response satisfying, for example, one query per second (QPS) requirement. The disclosed techniques can achieve additional or different technical advantages.

Figure 1:
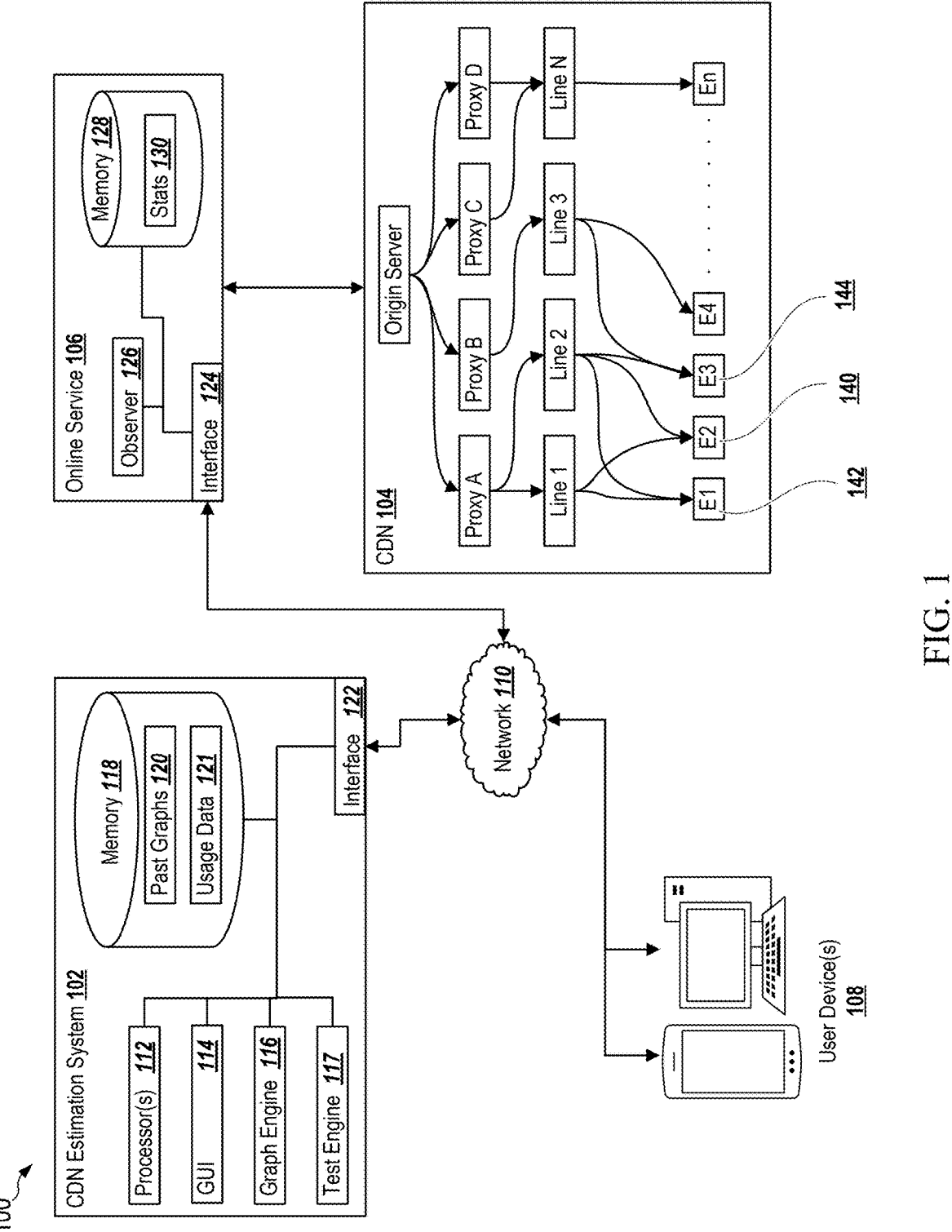
FIG. 1 illustrates a block diagram of an example system generating a model to estimate a capacity and condition of a CDN.

FIG. 1 illustrates a block diagram of an example system 100 generating a model to estimate a capacity and condition of a CDN. The system 100 includes a CDN estimation system 102 and a CDN 104 which can be monitored by an online service 106. Various components within system 100 can communicate using network 110, and one or more user devices 108 can access the CDN estimation system 102 to display information or otherwise interact with the CDN estimation system 102.

The CDN 104 can be an online CDN that serves a region or portion of the world. The CDN 104 can be a network of servers or other computing nodes strategically distributed throughout the globe or service region. In some implementations, the CDN 104 primarily enhances the delivery of web content, such as images, videos, and HTML files, by storing them at proxy servers that are geographically closer to the end-users. This geographic distribution can significantly reduce latency.

In some implementations, when a user requests content from a website or other internet service, the CDN 104 intercepts the request and serves the content from the nearest server, rather than routing it directly from the origin server. This process, known as caching, involves storing copies of frequently accessed content on multiple servers (proxy servers and edge servers) within the CDN.

The topology of the CDN 104 can involve a hierarchical structure. At the top level are one or more origin or source servers, which hold the original copies of content. Below the origin servers can include multiple tiers of proxies, and below those are edge servers, strategically placed in data centers throughout the service region (e.g., world, Asia, North America, etc.). In some implementations, when a user requests content, it is first routed to the nearest edge server. If the content is cached on that server, it is delivered directly to the user. If not, the edge server fetches the content from a higher-tier server or the origin server and caches it for future requests. This tiered architecture enables efficient content delivery, even during peak traffic periods, by distributing the load across multiple servers and minimizing the distance the content must travel. Additionally, the CDN 104 can employ load balancing techniques to distribute traffic evenly among the edge servers, further improving performance and reliability.

The CDN 104 can be monitored or managed by one or more online services 106. The online service 106 can monitor and record real-time and statistical network traffic, device usage, as well as statuses of nodes or servers in the CDN 104. In some implementations, the online service 106 can be a server or service provider, that is responsible for allocating and maintaining the various components (both hardware and abstract) within the CDN 104. The online service 106 can include an observer 126, which can be an application, program, or multiple applications and programs which monitor and record network traffic and usage statistics as well as statuses of devices or servers throughout the CDN 104. In some implementations, the observer 126 records statistic data (stats) 130, which can include one or more of upstream and/or downstream traffic, usages, capacities/capabilities/bandwidths of servers/nodes in the CDN 104, as well as information related to the topology of the CDN 104. It should be noted that the CDN's 104 topology may change rapidly (e.g., on a minute-to-minute basis, or hourly) depending on demand, load balancing functionality, availability, and/or statuses of underlying servers/nodes. For example, if the illustrated edge server E2 140 fails, then the proxy "line 2" may begin to receive additional traffic or pulls from E1 142, or E3 144 in response. Observer 126 can monitor this traffic usage, as well as the status of E2 140 and provide an updated topology to be stored in memory 128.

Memory 128 can represent a single memory or multiple memories. The memory 128 can include any memory or database module and can take the form of volatile or non-volatile memory including, without limitation, magnetic media, optical media, random access memory (RAM), read-only memory (ROM), removable media, or any other suitable local or remote memory component. The memory 128 can store various objects or data, including digital asset data, public keys, user and/or account information, administrative settings, password information, caches, applications, backup data, repositories storing business and/or dynamic information, and any other appropriate information associated with the online service 106, including any parameters, variables, algorithms, instructions, rules, constraints, or references thereto. Additionally, the memory 128 can store any other appropriate data, such as VPN applications, firmware logs and policies, firewall policies, a security or access log, print or other reporting files, as well as others. While illustrated within the system 100, memory 128 or any portion thereof, including some or all of the particular illustrated components, can be located remote from the system 100 in some instances, including as a cloud application or repository or as a separate cloud application or repository when the system 100 itself is a cloud-based system.

The CDN estimation system 102 can request that stats 130 from one or more online services 106 to help generate a capacity model of the CDN 104. The stats 130 can include, for example, data of representing a topology of the CDN 104 as well as usage data for various nodes or servers within the CDN 104. The online services 106 can provide such information to the CDN estimation system 102 through the network 110 via interface 124.

Interface 124 can be used by the online service 106 to communicate with other systems in a distributed environment—including within the system 100—connected to the network 110 (e.g., CDN estimation system 102, user devices 108, and other systems communicably coupled to the illustrated online service 106 and/or network 110. Generally, the interface 124 includes logic encoded in software and/or hardware in a suitable combination and operable to communicate with the network 110 and other components. More specifically, the interface 124 can include software supporting one or more communication protocols associated with communications such that the network 110 and/or interface's 124 hardware is operable to communicate physical signals within and outside of the illustrated system 100. Still further, the interface 124 can allow the online service 106 to perform the operations described herein.

Network 110 facilitates wireless or wireline communications between the components of the system 100 (e.g., between the CDN estimation system 102, the online service 106, the user devices 108, etc.), as well as with any other local or remote computers, such as additional mobile devices, clients, servers, or other devices communicably coupled to network 110, including those not illustrated in FIG. 1. In the illustrated environment, the network 110 is depicted as a single network, but can comprise more than one network without departing from the scope of this disclosure, so long as at least a portion of the network 110 can facilitate communications between senders and recipients. In some instances, one or more of the illustrated components (e.g., the CDN estimation system 102, online service 106, CDN 104, etc.) can be included within or deployed to network 110 or a portion thereof as one or more cloud-based services or operations. The network 110 can be all or a portion of an enterprise or secured network, while in another instance, at least a portion of the network 110 can represent a connection to the Internet. In some instances, a portion of the network 110 can be a virtual private network (VPN). Further, all or a portion of the network 110 can comprise either a wireline or wireless link. Example wireless links can include 802.11a/b/g/n/ac, 802.20, WiMax, LTE, and/or any other appropriate wireless link. In other words, the network 110 encompasses any internal or external network, networks, sub-network, or combination thereof operable to facilitate communications between various computing components inside and outside the illustrated system 100. The network 110 can communicate, for example, Internet Protocol (IP) packets, Frame Relay frames, Asynchronous Transfer Mode (ATM) cells, voice, video, data, and other suitable information between network addresses. The network 110 can also include one or more local area networks (LANs), radio access networks (RANs), metropolitan area networks (MANs), wide area networks (WANs), all or a portion of the Internet, and/or any other communication system or systems at one or more locations.

User devices 108 are computing devices or computers used by one or more users and developer of the software application to interact within system 100, respectively. For example, the user devices 108 can interact with the CDN estimation system 102 to review live capacity estimations of the CDN 104 in a graphical user interface (GUI). In some cases, system 100 describes an enterprise computing environment, where the user devices 108 can analyze database objects (e.g., past graphs 120, stats 130, etc.). As used in the present disclosure, the term "computer" or "computing devices" is intended to encompass any suitable processing device. For example, the user devices 108 can be any computer or processing device such as, for example, a blade server, general-purpose personal computer (PC), Mac®, workstation, UNIX-based workstation, or any other suitable device. In other words, the present disclosure contemplates computers other than general-purpose computers, as well as computers without conventional operating systems. Similarly, the user devices 108 can be any system that can request data and/or interact with the CDN estimation system 102. The user devices 108, in some instances, can be desktop systems, a client terminal, or any other suitable device, including a mobile device, such as a smartphone, tablet, smartwatch, or any other mobile computing device. In general, each illustrated component can be adapted to execute any suitable operating system, including Linux, UNIX, Windows, Mac OS®, Java™, Android™, Windows Phone OS, or iOS™, among others. The user devices 108 can include one or more specific applications executing on the user devices 108, or the user devices 108 can include one or more Web browsers or web applications that can interact with particular applications executing remotely from the user devices 108.

The CDN estimation system 102 requests and receives statistics 130 from the online service 106 that can detail both live or real-time (e.g., accurate to the second, minute, or another time unit) and historical (e.g., past 30 days, past 6 months, etc.) usage data and structure or topology data for the CDN 104. This data is then used to construct a model such as a graph that represents the CDN 104, and can be tested to estimate the CDN's 104 capacity, and capacity of the CDN's 104 proxies and edge nodes. The CDN estimation system 102 includes an interface 122, which can be similar to, or different from interface 124. A memory 118 is also included in the CDN estimation system 102, which can be different from or similar to memory 128 as described above. The CDN estimation system 102 can further include one or more processors 112, a graphical user interface (GUI) 114, a graph engine 116, and a test engine 117. The CDN estimation system 102 can include and/or be coupled with additional or different components.

Each of the one or more processors 112 can be a central processing unit (CPU), an application specific integrated circuit (ASIC), a field-programmable gate array (FPGA), or another suitable component. Generally, the processor 112 executes instructions and manipulates data to perform the operations of the CDN estimation system 102. Specifically, the processor 112 executes the algorithms and operations described in the illustrated figures, as well as the various software modules and functionality, including the functionality for sending communications to and receiving transmissions from online service 106, as well as to other devices and systems. Each processor 112 can have a single or multiple cores, with each core available to host and execute an individual processing thread. Further, the number of, types of, and particular processors 112 used to execute the operations described herein can be dynamically determined based on a number of requests, interactions, and operations associated with the CDN estimation system 102.

Regardless of the particular implementation, "software" includes computer-readable instructions, firmware, wired and/or programmed hardware, or any combination thereof on a tangible medium (transitory or non-transitory, as appropriate) operable when executed to perform at least the processes and operations described herein. In fact, each software component can be fully or partially written or described in any appropriate computer language including C, C++, JavaScript, Java™, Visual Basic, assembler, Perl®, any suitable version of 4GL, as well as others.

GUI 114 of the CDN estimation system 102 interfaces with at least a portion of the system 100 for any suitable purpose, including generating a visual representation of any particular application or results and/or the content associated with any components of the user devices 108. In particular, the GUI 114 can be used to present results of a query or allow the developer to input queries to the CDN estimation system 102, as well as to otherwise interact and present information associated with one or more applications. GUI 114 can also be used to view and interact with various web pages, applications, and web services located local or external to the CDN estimation system 102. Generally, the GUI 114 provides the user with an efficient and user-friendly presentation of data provided by or communicated within the system. The GUI 114 can include a plurality of customizable frames or views having interactive fields, pull-down lists, and buttons operated by the user. In general, the GUI 114 is often configurable, supports a combination of tables and graphs (bar, line, pie, status dials, etc.), and is able to build real time portals, application windows, and presentations. Therefore, the GUI 114 contemplates any suitable graphical user interface, such as a combination of a generic web browser, a web-enable application, intelligent engine, and command line interface (CLI) that processes information in the platform and efficiently presents the results to the user visually.

Graph engine 116 can be an application that receives data that reflect or represent the CDN topology (e.g., statistics 130) from the online service 106 and generates a graph model representing the CDN 104. An example graph model is illustrated below with respect to FIG. 2. In general, the graph engine 116 can designate nodes at various levels of a hierarchy and draw appropriate edges between the nodes according to the topology data (e.g., statistics 130) obtained by monitoring the underlying real-world CDN 104. In some instances, each edge has a weight or metric weighted according to one or more statistics. For example, the graph engine 116 can take into account usage data 121 stored in memory 118, or statistics 130 provided by the online service 106. In some implementations, the graph engine 116 also accounts for past graphs 120, which are previously generated graphs representing the CDN 104. The graph engine 116 can generally create a model of nodes and edges and provide it to GUI 114 for display, as well as to the test engine 117 for testing.

Test engine 117 uses the generated graph model from the graph engine 116 and calculates the capacity of various portions of the graph as well as the entire graph by using a series of flood filling algorithms to test the model. In some implementations, the test engine 117 can analyze the graph model to determine the capacity of the CDN 104 using specifically designed algorithms that can estimate the capacity in an accurate and computational efficient manner. This enables more efficient allocation of upstream resources, and adaptability in the even the CDN topology changes. The testing process is described in more detail below with respect to FIG. 2.

Figure 2:
FIG. 2 illustrates an example CDN model.
Figure 2:
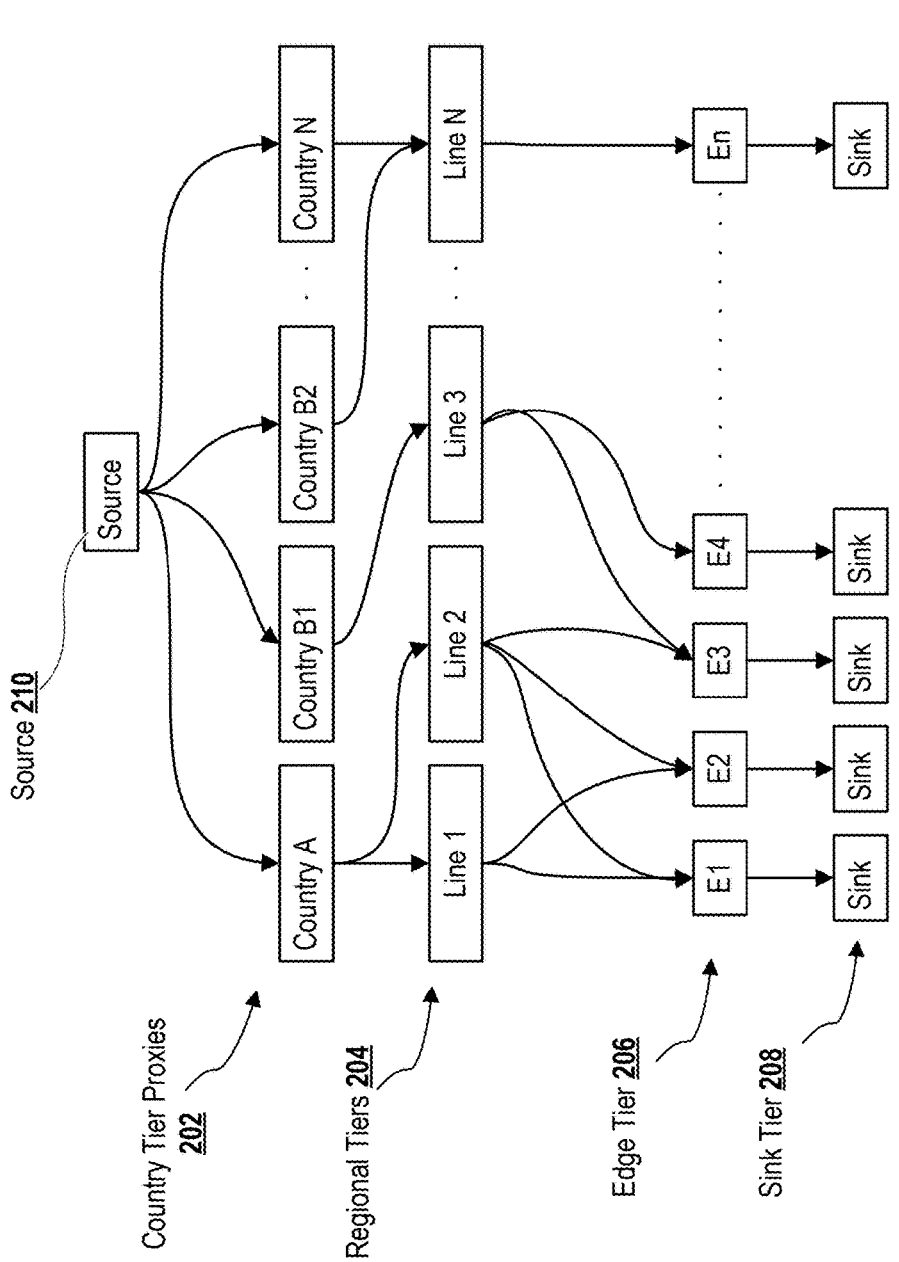

FIG. 2 illustrates an example CDN model 200. This model 200 can be the generated by a graph engine, such as graph engine 116 of FIG. 1, and can represent the topology of a live (e.g., in use), planned, or past CDN. The model 200 includes a hierarchical structure with a top source node 210 representing the original or source server of the CDN 104, and one or more sinks representing the destinations (e.g., user devices) of the CDN 104. Below the top node, there are multiple tiers such as tiers 202, 204, 206, 208. The higher the tier, the closer it is to the top node, and thus a lower depth from the top node. In some implementations, a node in a higher tier represents a shorter distance (e.g., in terms of traffic hops, latency, or another measure) from the source node than a node in a lower tier. In some implementations, the tiers of the model are modeled based on geographic regions or service provides of the underlying physical CDN. In the illustrated example, the model 200 can represent a global CDN and the highest tier are country tier proxies 202. This can, for example, represent a proxy server or node for each country covered by the CDN. In some implementations, a country (e.g., a large country with heavy data traffic) can be represented by two or more proxy nodes, such as the Country B1 and Country B1 nodes shown in FIG. 2. Below the country tier 202 are multiple regional tiers 204 or line tiers 204. In some implementations, the line tier 204 is an abstraction that is created to represent sub-regions, distinct ISPs, or other differentiators within a country. This line tier 204 enables the model 200 to accurately reflect environmental restrictions in practice. Environmental restrictions such as ISPs that serve limited regions or provide exclusive service to particular edge nodes. Each region tier node 204 services one or more country tier nodes 202. In some implementations, there are multiple tiers in the regions tiers 204. That is, while the illustrated example CDN model 200 includes three tiers, besides the source 210 and sink tier 208, another number of tiers such as four tiers, ten tiers, or only two tiers, are possible.

Each edge node in the edge tier 206 can represent an edge service that provides content delivery (or satisfies pull requests) to a locality such as a city or town, or subgroup of users. In the CDN model 200, sinks or sink nodes 208 are provided, which are configured to consume data passed through the CDN model 200 and simulate user devices or nodes.

The source node 210 acts as the origin server. ISI, the described testing algorithm (e.g., flood filing algorithm) can be run on the model 200 from the source node 210 to determine its overall capacity of the source node, as well as the capacity of each country tier proxy 202. ISI, the testing algorithm can be similarly applied to another node in the model 200 to estimate the capacity the another node (and the capacities of nodes underneath it). The test algorithm can be performed by, for example, a test engine as described above with respect to FIG. 1. To test the capacity of the model 200, data can be injected into the model 200 to simulate the traffic in a top-down manner, according to, for example, a flood filing algorithm.

For example, a country tier proxy 202 can be selected using a selection algorithm such as a weighted round robin algorithm where the weights are determined according to the traffic volume for each country, for example, in the past 24 hours. ISI, the weights can be determined to prioritize higher traffic countries to ensure their capacity is "filled" early in the process when the source is injecting larger data rates. ISI, the weighted round robin algorithm can be chosen (e.g., Smooth Weighted Round Robin algorithm) to ensure that no particular country tier proxy 202 is starved (e.g., ignored or untested).

After a country tier proxy 202 is selected, the source injects a predetermined data rate (e.g., 256 Mb/s). The data rate can be determined, for example, based on, a default value, a target data rate, a historic capacity of the model 200 and/or the country tier proxy 202, and/or other factors. In some implementations, the data rate can start with a larger rate and reduce to a smaller rate if the larger rate fails, for example, to improve the efficiency of the algorithm. For example, a binary iteration algorithm can be used to select a proper starting data rate. For example, for a country with an ideal/target capacity of c, the target capacity of c can be decomposed to the sum of powers of 2, $c=b_i \times 2^i + b_j \times 2^j + \ldots + b_0 \times 2^0$, where $b_i$, $b_j$, . . . $b_0$ are binary numbers, and $i > j > \ldots 0$ in a descending order. In some implementations, the initial test data rate can be selected as $2^i$, the largest power of 2 component.

The injected data can be simulated down through the regional tiers 204, distributing it according to current usage data or historical usage data, and then to the nodes of the edge tier 206 which service the appropriate regional lines. Because the capacity of each edge node is known, it can be determined whether the edge tiers will have sufficient capacity to consume the injected data. If they are able to consume the injected data, the capacity has not been exceeded, and their capacity is reduced by the amount of the injected data (e.g., 256 Mb/s, distributed proportionally to usage amongst the applicable edge nodes). The source can then select a new country node and begin a new test. When the applicable edge nodes are not able to consume the injected data, their capacity has been exceeded, and the injected data rate is reduced. In some implementations the injected data rate is reduced by half (e.g., from 256 to 128 Mb/s) each time a set of edge nodes have their available capacity exceeded.

When distributing the injected traffic to child nodes of a particular proxy, each subordinate edge is given a weighting factor. In some implementations, the weighting factor for edges connecting the country tier proxies 202 to the regional tiers 204 can be, for example, is a ratio of the traffic to that regional proxy compared to the total traffic through the country proxy. The traffic can be historic traffic such as PCT99, PCT95, etc. PCT99 and PCT95 can represent the historic 99% and 95% traffic rates over the previous 30 days. An example of the weight or weighting factor for edges can be $$\frac{PCT99_{isp}}{PCT99_{total}},$$

for example. In some implementations, the weighting factor for edges connecting the regional tiers 204 to the edge tier 206 can be $1-R(x)$ where $R(x)$ is the relay source rate of a given node x. These weighting factors can be used to assign portions of the injected traffic to the appropriate node accordingly.

This process can be performed iteratively: Select a country proxy node, test it, and based on whether the edge node capacity is exceeded by distributing the data down through the network proportionally to usage data, reduce either the available capacity or the injected data rate. When the injected data rate is 1 Mb/s or less, the cumulative capacity of the edge nodes in the model 200 is totaled to determine a total model capacity.

In some implementations, the entire process from retrieving CDN topology data and statistics, to determining capacity occurs cyclically (e.g., every 5 minutes, every minute, or every 30 seconds, etc.). Such that the model and its associate capacity are known on a real-time or near-real time basis.

An example process or algorithm is as follows:
1. Use countries PCT99/95 as their daily traffic, this metric can be used as the weight for flood filling turns.
2. Based on the weight, use Smooth Weighted Round Robin algorithm to pick countries to fill, this will ensure the important countries (with more traffic) will generally be filled first.
3. To determine how much to fill in every test (e.g., how many Mb/s), it can be considered that too small a data rate and the execution process take too long, but if the data rate is too large, the process will be inaccurate as some countries which might not need as much bandwidth pre-allocation (which can lead to other countries being unable to get their share).
   a. To solve this, a binary iteration algorithm can be used. Assume a country (or proxy server) with an ideal capacity of c, that capacity always be decomposed to the sum of powers of 2.
   b. Therefore, for example the process can start from 256 Mb/s to fill as much as possible until the capacity is reached. Then try 256/2=128 Mb/s, then 128/2=64 Mb/s, until 1 Mb/s is reached. As major countries (or the higher capacity proxies) would already be filled once 1 Mb/s is reached, the rest of the executions should not take too long. In some implementations, this system can yield the result within ~3 seconds (<1 s for execution, the remaining is due to dependency fetching).
4. For each filling process, each edge (a link between line and nodes, nodes and nodes) can be given a factor or weight:
   a. If it is an edge between line to internet service provider (ISP) or Region node, the factor can be $$\frac{PCT99_{isp}}{PCT99_{total}},$$

and if this filling fails, the line that is currently being filled, can stop and be declared full. This will resolve the case that for proxies or countries like Thailand that use multiple, separate ISPs, the distributed traffic is correct and align with its ISP ratio.

b. If it's an edge between node x to node y, the factor will be the $1-R(x)$ where $R(x)$ is the relay source rate of this node x, which can be relatively stable value. This can simulate the scenario where no further traffic needs to be relayed to upper levels.

c. The order of filling is based on what is given from the online scheduling system, so the results are accurate and reliable, and not contradicted to online results.

5. As an extension to this algorithm, each edge with a cost parameter can be considered. In some implementations, by implementing various strategies, a theoretical optimal cost for the CDN and be determined.

Figure 3:
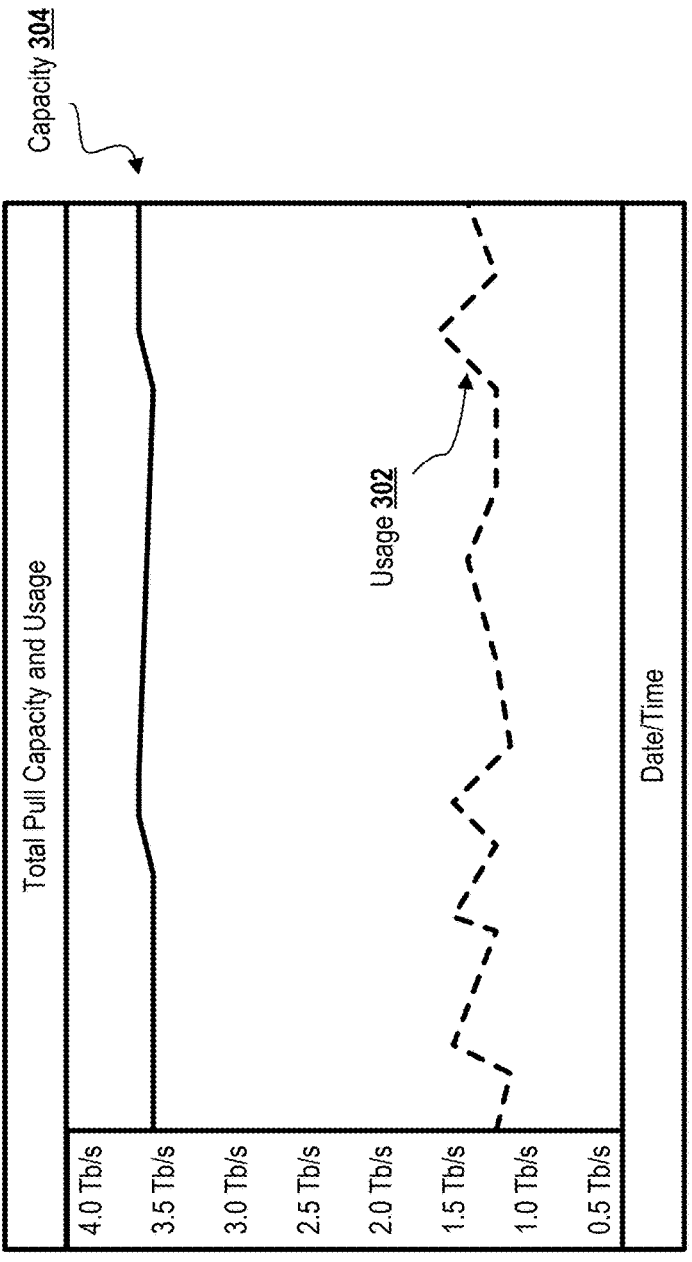
FIG. 3 illustrates an example graphical user interface for displaying estimated capacity based on a CDN model.

FIG. 3 illustrates an example graphical user interface 300 for displaying estimated capacity based on a CDN model. The illustrated GUI 300 is a line graph, with data rate on the Y axis, and time on the X axis. The solid line represents total CDN capacity 304, while the dotted line represents current and historical total usage 302. In some implementations, a graph is shown for each individual proxy (e.g., each country, region, or edge node) within the CDN.

In some implementations, this GUI 300 enables users to quickly ascertain the overall network status and identify outages or failures, for example, because rapid changes in capacity will appear as discontinuities or steep slopes in the capacity line 304.

This network status and calculated capacity is useful for managers when planning or scheduling upstream resources, performing load balancing between proxies, allocating network resources (e.g., reducing available capacity to underutilized nodes in order to provide additional capacity elsewhere), reconfiguring the CDN for anticipated high traffic demands (e.g., public events, etc.) or reducing cost by removing redundant clusters, among other things.

Figure 4:
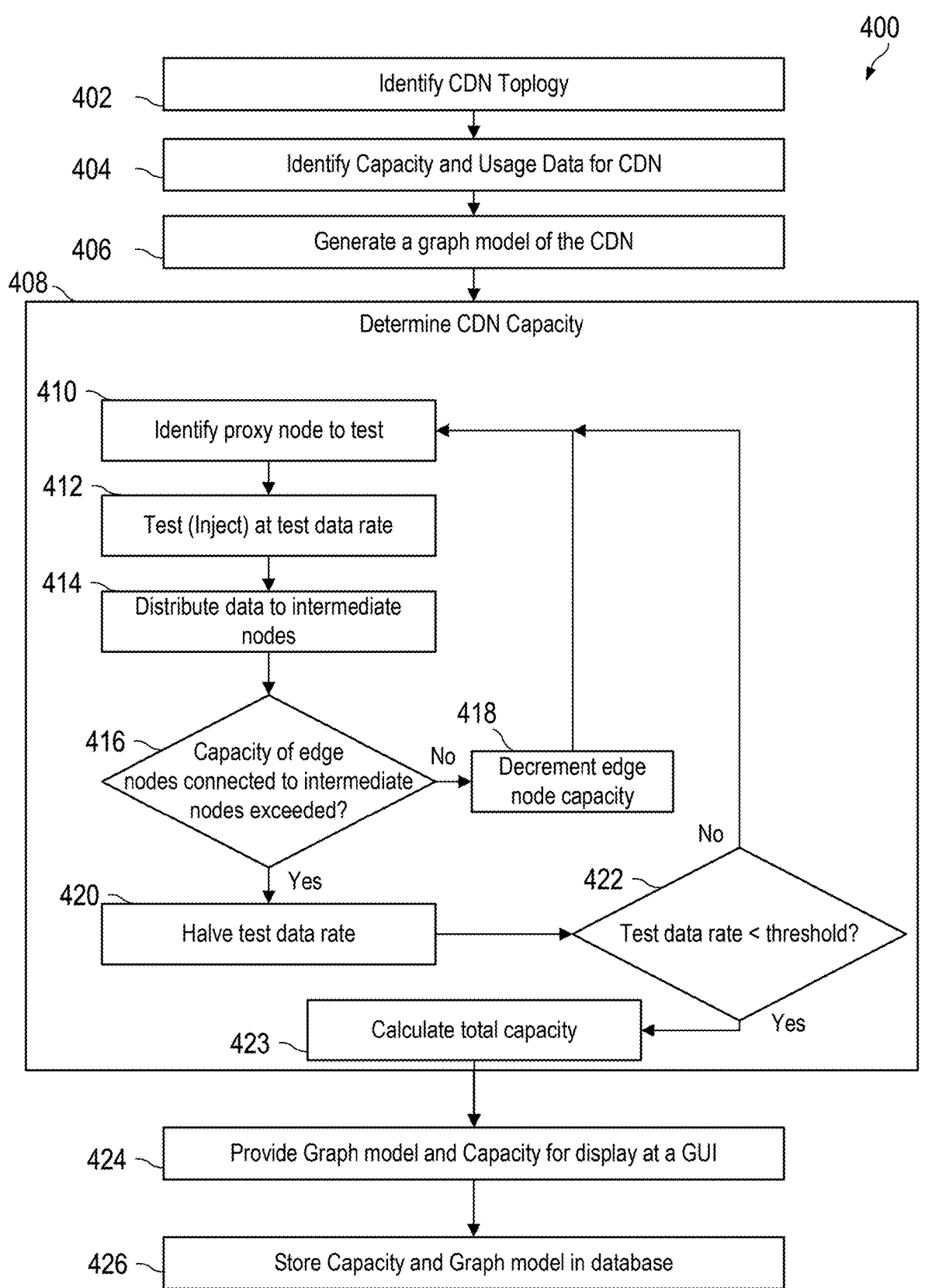
FIG. 4 is a flowchart illustrating an example process for generating a model to estimate a capacity and condition of a CDN.

FIG. 4 illustrates a flow chart of the example process 400 for generating a model to estimate a capacity and condition of a CDN (e.g., the CDN 104). The operations of process 400 can be performed, for example, based on the techniques described with respect to FIGS. 1-3, or in another manner. The operations shown in process 400 may not be exhaustive and that other operations can be performed as well before, after, or in between any of the illustrated operations. Further, some of the operations may be performed simultaneously, or in a different order than shown in FIG. 4. In some implementations, some of the operations may be performed by a computer, or multiple computers. The one or more computers the process 400 will be described as being performed by a system of, located in one or more locations, and programmed appropriately in accordance with this specification. For example, one or more of a computation system 500 of FIG. 5, appropriately programmed, can perform the process 400. As another example, one or more computer in the example system 100 (e.g., the CDN estimation system 102), when appropriately programmed, can perform the process 400.

At 402, CDN topology is identified. This can be provided by an online service or internal monitoring system, which identifies the CDN proxies/proxy nodes (e.g., country tier proxy 202), tiers provided (e.g., tiers 202, 204, 206 and 208), and the respective connections (e.g., the edges or paths) between components of the CDN (e.g., high level proxy nodes, intermediate level or line nodes, and edge nodes).

At 404, capacity and usage data is identified for the CDN. In some implementations, usage data for each node or set of nodes within the CDN is provided by one or more online services (e.g., online service(s) 106). Alternatively, usage and capacity data can be queried from a database or other repository. In some implementations, the usage data is real-time or live usage data, that represents the current usage in one or more nodes of the CDN. In some implementations, the capacity is for each edge node, and based on that edge node's theoretical maximum thruput.

At 406, a graph model of the CDN is generated. The graph model can include a node for each proxy/server within the CDN. Additional nodes are possible. For example, the graph model can include intermediate tiers and abstract nodes that represent particular regions or sub-regions but are in practice served by a single proxy or server. Each node can be connected to one or more parent nodes, or nodes that are higher tier, and one or more daughter nodes, or nodes that are lower tier with the exception of the bottom tier or edge nodes, by edge connections. Each edge connection connects two nodes and represents a communication flow path between the nodes. In some implementations, the edges include a weight or a factor which is used to determine how traffic is to be distributed through the CDN. The weight can be calculated based on the usage data, for example, historical data for a particular proxy as a ratio of the total data.

At 408, the CDN capacity is determined by testing the graph model. In some implementations, the entire process within 408 can be computationally efficient executed and completed, for example, within in less than 5 seconds, such that process 400 can be rapidly repeated, and therefore present live or near real-time results.

At 410, a proxy node to test is identified. In some implementations, the proxy node is selected by using a weighted round robin algorithm. The weighted round robin algorithm can be, for example, a smooth weighted round robin algorithm. In general, the weighted round robin algorithm cycles over the proxies to be tested and gives one service opportunity per cycle, weighted round robin can offer each proxy a fixed number of opportunities, as specified by the configured weight, which serves to prioritize the more heavily weighted proxies, while ensuring that each proxy is tested at least once. A proxy server can be a regional server that represents an entire country in a portion of a global CDN. In some implementations the proxy server is selected at 410 is an intermediate node, or a lower tier node, where the capacity being determined in 408 is of a sub-portion of a larger CDN.

At 412, test data in sent through the identified proxy node to test that portion of the network. The test data is injected at a predetermined test data rate, which can be, for example 256 Mb/s, and is reduced as the proxy nodes reach capacity.

At 414, the test data is distributed to intermediate and lower nodes that are connected to the identified proxy node. In some implementations, the test data is distributed uniformly across the intermediate nodes. In some implementations, the test data is distributed according to the weight factor of each edge connecting the intermediate nodes to the identified proxy. In some implementations, instead of intermediate nodes, the data is distributed directly from the identified proxy to connected edge nodes.

At 416, the capacity of the edge nodes connected to the intermediate nodes to which data was distributed is considered. If the total capacity of the edge nodes can satisfy the test data rate, then their capacity is not considered exceeded, and process 400 proceeds to 418.

At 418, the capacity of the edge nodes is decremented according to the test data rate. In some implementations each edge node is decremented as a function of the weight factor of its associated edge connection to the intermediate node(s) it serves. Once their capacity is reduced, process 400 can return to 410 where testing continues. For example, a second proxy node to test can be identified at 410, and the second proxy node is tested at 412 to determine a second tested capacity of the second proxy node; and so on. As discussed in below, the capacity of the graph model can be based on the first tested capacity of the first proxy node and the second tested capacity of the second proxy node.

Returning to 416, if the edge notes capacity is exceeded, that indicates that the edge nodes cannot support the current test data rate (and cumulatively past tested data rates) and process 400 proceeds to 420. At 420, the test data rate is decreased. As an example, shown in FIG. 4, for the test data rate is halved, which can help improve the computational efficiency. For example, if the test data rate was 256 Mb/s, it can be reduced to 128. If the test data rate was 32 Mb/s, it is reduced to 16 Mb/s. In some other implementations, the test data rate can be decreased by another value (e.g., a step length, a percentage, or another number).

At 422, it is determined whether the test data rate has been reduced below a predetermined threshold. That is, if the test data rate is reduced to a certain point, then it is an indicator that the capacity of the proxy nodes has been filled for each node and so the CDN capacity has been determined. In some implementations, threshold is 2 Mb/s, that is, if the test data rate is less than 2 Mb/s then the capacity of each proxy node is known to within 3 Mb/s. In some implementations the predetermined threshold is 1 Mb/s, or another value. If the data rate is not below the predetermined threshold, testing continues with the new data rate at 410. If the data rate is below the predetermined threshold, then process 400 proceeds to 423 to determine the CDN capacity and 408 is complete.

At 423, the total capacity of the CDN is determined. In some implementations, this can be calculated by summing, or accumulating tested capacities of the proxy nodes in the CDN. The tested capacity of each proxy node can be determined after a total number of tests has been performed in each proxy node. For example, if a proxy node was test at 256, 256, 128, 32, 8, 4, 2, and 1 Mb/s and these data rates have successfully filled, then that the tested capacity can be the sum of those test data rates, or 687=(256+256+128+32+8+4+2+1) Mb/s. Once a capacity for each proxy node is determined, they can be added together to calculate the capacity of the overall CDN. For example, the total capacity of the CDN shown in model 200 can be a sum of the tested capacities of all the proxy nodes of the country tier proxies 202, Country A, Country B1, Country B2, . . . and Country N.

At 424, the graph model and determined capacity can be provided for or displayed in a graphical user interface (GUI) for analysis. In some implementations, the GUI is similar to GUI 300 as illustrated above with respect to FIG. 3.

At 426, the capacity data and graph model are stored in a database. This can be used for future analysis, generation of future graph models, or generally review of the performance of the CDN.

Figure 5:
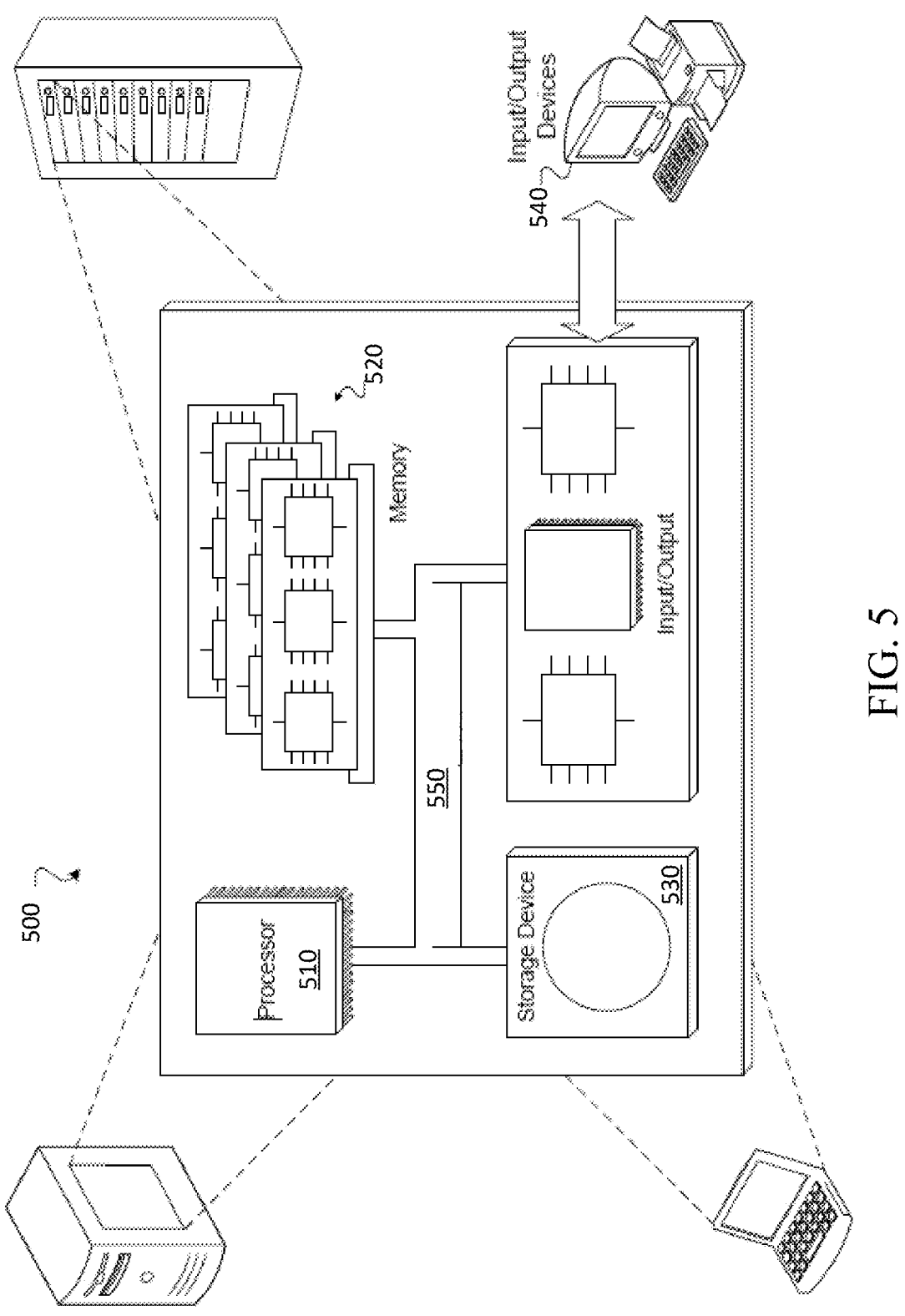
FIG. 5 illustrates a schematic diagram of an example computing system.

FIG. 5 illustrates a schematic diagram of an example computing system 500. The system 500 can be used for the operations described in association with the implementations described herein. For example, the system 500 may be included in computing devices of the one or more online components and/or the one or more offline components. The system 500 includes a processor 510, a memory 520, a storage device 530, and an input/output device 540, which are interconnected using a system bus 550. The processor 510 is capable of processing instructions for execution within the system 500. In some implementations, the processor 510 is a single-threaded processor. The processor 510 is a multi-threaded processor. The processor 510 is capable of processing instructions stored in the memory 520 or on the storage device 530 to display graphical information for a user interface on the input/output device 540.

The memory 520 stores information within the system 500. In some implementations, the memory 520 is a computer-readable medium. The memory 520 can be a volatile memory unit or a non-volatile memory unit. The storage device 530 is capable of providing mass storage for the system 500. The storage device 530 is a computer-readable medium. The storage device 530 may be a floppy disk device, a hard disk device, an optical disk device, or a tape device. The input/output device 540 provides input/output operations for the system 500. The input/output device 540 includes a keyboard and/or pointing device. The input/output device 540 includes a display unit for displaying graphical user interfaces.

Implementations of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Implementations of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random-access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship with each other. In some implementations, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

As used in this disclosure, the terms "a," "an," or "the" are used to include one or more than one unless the context clearly dictates otherwise. The term "or" is used to refer to a nonexclusive "or" unless otherwise indicated. The statement "at least one of A and B" has the same meaning as "A, B, or A and B." In addition, the phraseology or terminology employed in this disclosure, and not otherwise defined, is for the purpose of description only and not of limitation. Any use of section headings is intended to aid reading of the document and is not to be interpreted as limiting; information that is relevant to a section heading may occur within or outside of that particular section.

As used in this disclosure, the term "about" or "approximately" can allow for a degree of variability in a value or range, for example, within 10%, within 5%, or within 1% of a stated value or of a stated limit of a range.

As used in this disclosure, the term "substantially" refers to a majority of, or mostly, as in at least about 50%, 60%, 70%, 80%, 90%, 95%, 96%, 97%, 98%, 99%, 99.5%, 99.9%, 99.99%, or at least about 99.999% or more.

Values expressed in a range format should be interpreted in a flexible manner to include not only the numerical values explicitly recited as the limits of the range, but also the individual numerical values or sub-ranges encompassed within that range as if each numerical value and sub-range is explicitly recited. For example, a range of "0.1% to about 5%" or "0.1% to 5%" should be interpreted to include about 0.1% to about 5%, as well as the individual values (for example, 1%, 2%, 3%, and 4%) and the sub-ranges (for example, 0.1% to 0.5%, 1.1% to 2.2%, 3.3% to 4.4%) within the indicated range. The statement "X to Y" has the same meaning as "about X to about Y," unless indicated otherwise. Likewise, the statement "X, Y, or Z" has the same meaning as "about X, about Y, or about Z," unless indicated otherwise.

Particular implementations of the subject matter have been described. Other implementations, alterations, and permutations of the described implementations are within the scope of the following claims as will be apparent to those skilled in the art. While operations are depicted in the drawings or claims in a particular order, such operations are not required to be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations are not required in all implementations, and the described components and systems can generally be integrated together or packaged into multiple products.

Accordingly, the previously described example implementations do not define or constrain the present disclosure. Other changes, substitutions, and alterations are also possible without departing from the spirit and scope of the present disclosure.

The foregoing description of the specific implementations can be readily modified and/or adapted for various applications. Therefore, such adaptations and modifications are intended to be within the meaning and range of equivalents of the disclosed implementations, based on the teaching and guidance presented herein.

The breadth and scope of the present disclosure should not be limited by any of the above-described example implementations but should be defined only in accordance with the following claims and their equivalents. Accordingly, other implementations also are within the scope of the claims.

The invention claimed is:

1. A computer implemented method comprising:
determining a topology of a content delivery network (CDN), wherein the topology of the CDN comprises a plurality of edge nodes, a plurality of proxy nodes, a plurality of intermediate nodes, a plurality of first edges connecting the proxy nodes to the intermediate nodes, and a plurality of second edges connecting the intermediate nodes to the edge nodes;
generating a graph model of the CDN using the topology of the CDN;
determining a first proxy node to test;
testing the first proxy node at a test data rate to determine a first tested capacity of the first proxy node by:
distributing the test data rate across intermediate nodes connected to the first proxy node;
determining the first tested capacity of the first proxy node based on whether a total available capacity of edge nodes connected to an intermediate node connected to the first proxy node exceeds a distributed test data rate at the intermediate node;
determining a second proxy node to test;
testing the second proxy node to determine a second tested capacity of the second proxy node; and determining a capacity of the graph model based on the first tested capacity of the first proxy node and the second tested capacity of the second proxy node.

2. The method of claim 1, comprising:
receiving an available capacity for each edge node of the plurality of edge nodes; and
determining the total available capacity of the edge nodes connected to the intermediate node connected to the first proxy node based on respective available capacities of the edge nodes connected to the intermediate node connected to the first proxy node.

3. The method of claim 1, comprising:
in response to determining that the total available capacity of the edge nodes connected to each intermediate node connected to the first proxy node exceeds the distributed test data rate at each intermediate node:
reducing an available capacity of the edge nodes connected to each intermediate node connected to the first proxy node by the distributed test data rate.

4. The method of claim 1 comprising:
in response to determining that the total available capacity of the edge nodes connected to each intermediate node connected to the first proxy node does not exceed the distributed test data rate at each intermediate node:
reducing the test data rate by half and using the reduced test data rate in future tests.

5. The method of claim 4, wherein testing is performed iteratively until the test data rate is below a predetermined threshold.

6. The method of claim 1, wherein determining the topology of the CDN, comprises determining the topology of the CDN based on data of the plurality of edge nodes, the plurality of proxy nodes, the plurality of intermediate nodes, the plurality of first edges, and the plurality of second edges, and wherein the data is received from an online service in response to an application programming interface (API) call.

7. The method of claim 1, comprising:
receiving traffic usage data for each proxy node of the plurality of proxy nodes; and
wherein determining the first proxy node to test and determining the second proxy node to test are based on the traffic usage data for each proxy node of the plurality of proxy nodes.

8. The method of claim 7, wherein determining the first proxy node and determining the second proxy node to test comprise performing a weighted round robin algorithm, and wherein weights for the weighted round robin algorithm are selected based on the traffic usage data for each proxy node.

9. The method of claim 1, comprising:
determining traffic usage data for each intermediate node of the plurality of intermediate nodes; and
wherein distributing the test data rate across the intermediate nodes connected to the first proxy node based on their respective traffic usage data comprises distributing the test data rate proportionally to the respective traffic usage data of the intermediate nodes connected to the first proxy node.

10. The method of claim 1, wherein determining the capacity of the graph model comprises: summing tested capacities of the plurality of proxy nodes.

11. A non-transitory, computer-readable medium storing one or more instructions executable by a computer system to perform operations comprising:
determining a topology of a content delivery network (CDN), wherein the topology of the CDN comprises a plurality of edge nodes, a plurality of proxy nodes, a plurality of intermediate nodes, a plurality of first edges connecting the proxy nodes to the intermediate nodes, and a plurality of second edges connecting the intermediate nodes to the edge nodes;

generating a graph model of the CDN using the topology of the CDN;

determining a first proxy node to test;

testing the first proxy node at a test data rate to determine a first tested capacity of the first proxy node by:

distributing the test data rate across intermediate nodes connected to the first proxy node;

determining the first tested capacity of the first proxy node based on whether a total available capacity of edge nodes connected to an intermediate node connected to the first proxy node exceeds a distributed test data rate at the intermediate node;

determining a second proxy node to test;

testing the second proxy node to determine a second tested capacity of the second proxy node; and determining a capacity of the graph model based on the first tested capacity of the first proxy node and the second tested capacity of the second proxy node.

12. The non-transitory, computer-readable medium of claim 11, the operations comprising:

receiving an available capacity for each edge node of the plurality of edge nodes; and determining the total available capacity of the edge nodes connected to the intermediate node connected to the first proxy node based on respective available capacities of the edge nodes connected to the intermediate node connected to the first proxy node.

13. The non-transitory, computer-readable medium of claim 11, the operations comprising:

in response to determining that the total available capacity of the edge nodes connected to each intermediate node connected to the first proxy node exceeds the distributed test data rate at each intermediate node:

reducing an available capacity of the edge nodes connected to each intermediate node connected to the first proxy node by the distributed test data rate.

14. The non-transitory, computer-readable medium of claim 11, the operations comprising:

in response to determining that the total available capacity of the edge nodes connected to each intermediate node connected to the first proxy node does not exceed the distributed test data rate at each intermediate node:

reducing the test data rate by half and using the reduced test data rate in future tests.

15. The non-transitory, computer-readable medium of claim 14, wherein testing is performed iteratively until the test data rate is below a predetermined threshold.

16. The non-transitory, computer-readable medium of claim 11, wherein determining the topology of the CDN, comprises determining the topology of the CDN based on data of the plurality of edge nodes, the plurality of proxy nodes, the plurality of intermediate nodes, the plurality of first edges, and the plurality of second edges, and wherein the data is received from an online service in response to an application programming interface (API) call.

17. A computer-implemented system, comprising:

one or more computers; and one or more computer memory devices interoperably coupled with the one or more computers and having tangible, non-transitory, machine-readable media storing one or more instructions that, when executed by the one or more computers, perform one or more operations comprising:

determining a topology of a content delivery network (CDN), wherein the topology of the CDN comprises a plurality of edge nodes, a plurality of proxy nodes, a plurality of intermediate nodes, a plurality of first edges connecting the proxy nodes to the intermediate nodes, and a plurality of second edges connecting the intermediate nodes to the edge nodes;

generating a graph model of the CDN using the topology of the CDN;

determining a first proxy node to test;

testing the first proxy node at a test data rate to determine a first tested capacity of the first proxy node by:

distributing the test data rate across intermediate nodes connected to the first proxy node;

determining the first tested capacity of the first proxy node based on whether a total available capacity of edge nodes connected to an intermediate node connected to the first proxy node exceeds a distributed test data rate at the intermediate node;

determining a second proxy node to test;

testing the second proxy node to determine a second tested capacity of the second proxy node; and determining the capacity of the graph model based on the first tested capacity of the first proxy node and the second tested capacity of the second proxy node.

18. The computer-implemented system of claim 17, wherein the operations comprise:

receiving an available capacity for each edge node of the plurality of edge nodes; and determining the total available capacity of the edge nodes connected to the intermediate node connected to the first proxy node based on respective available capacities of the edge nodes connected to the intermediate node connected to the first proxy node.

19. The computer-implemented system of claim 17, wherein the operations comprise:

in response to determining that the total available capacity of the edge nodes connected to each intermediate node connected to the first proxy node exceeds the distributed test data rate at each intermediate node:

reducing an available capacity of the edge nodes connected to each intermediate node connected to the first proxy node by the distributed test data rate.

20. The computer-implemented system of claim 17, wherein the operations comprise:

in response to determining that the total available capacity of the edge nodes connected to each intermediate node connected to the first proxy node does not exceed the distributed test data rate at each intermediate node:

reducing the test data rate by half and using the reduced test data rate in future tests.

* * * * *